United States Patent
Albrecht et al.

(10) Patent No.: US 12,395,402 B2
(45) Date of Patent: Aug. 19, 2025

(54) METHOD AND APPARATUS FOR CONFIGURING AN APPLICATION

(71) Applicant: Siemens Aktiengesellschaft, Munich (DE)

(72) Inventors: Harald Albrecht, Nuremberg (DE); Stephan Hoeme, Schwabach (DE)

(73) Assignee: Siemens Aktiengesellschaft, Munich (DE)

( * ) Notice: Subject to any disclaimer, the term of this patent is extended or adjusted under 35 U.S.C. 154(b) by 15 days.

(21) Appl. No.: 18/283,342

(22) PCT Filed: Mar. 7, 2022

(86) PCT No.: PCT/EP2022/055722
§ 371 (c)(1),
(2) Date: Sep. 21, 2023

(87) PCT Pub. No.: WO2022/200026
PCT Pub. Date: Sep. 29, 2022

(65) Prior Publication Data
US 2024/0179050 A1    May 30, 2024

(30) Foreign Application Priority Data
Mar. 24, 2021   (EP) .................... 21164533

(51) Int. Cl.
*H04L 41/0806* (2022.01)
*H04L 41/0895* (2022.01)
*H04L 67/00* (2022.01)

(52) U.S. Cl.
CPC ...... *H04L 41/0806* (2013.01); *H04L 41/0895* (2022.05); *H04L 67/34* (2013.01)

(58) Field of Classification Search
CPC . H04L 41/0806; H04L 41/0895; H04L 67/34; H04L 41/12; H04L 67/51; H04L 67/12
See application file for complete search history.

(56) References Cited

U.S. PATENT DOCUMENTS

2016/0350105 A1   12/2016   Kumar et al.
2019/0041824 A1   2/2019   Chavez
(Continued)

FOREIGN PATENT DOCUMENTS

DE   112018005879 T5   8/2020

OTHER PUBLICATIONS

PCT International Preliminary Report on Patentability mailed Jun. 13, 2023 corresponding to PCT International Application No. PCT/EP2022/055722 filed Mar. 7, 2022, pp. 1-8.
(Continued)

*Primary Examiner* — Emmanuel L Moise
*Assistant Examiner* — Zia Khurshid
(74) *Attorney, Agent, or Firm* — Lempia Summerfield Katz LLC (57) ABSTRACT

Application developers want to incorporate and maintain only the absolutely essential TSN software in their container applications, but not complete TSN device stacks. At the same time, their TSN application containers are able to request TSN streams from the network dynamically at any time (ad hoc). For this, the TSN application containers require topology information from an Edge device (e.g., like the device access point(s) for TSN network(s)) in the simplest manner possible. A method and an apparatus are disclosed herein to solve the problem described above as a result of the required information and address tuples being provided to the container following installation and not needing to be already known during development.

10 Claims, 5 Drawing Sheets

(56) References Cited

U.S. PATENT DOCUMENTS

2020/0241864 A1* 7/2020 Duvur ..................... G06F 8/65
2020/0310394 A1* 10/2020 Wouhaybi ........... H04L 67/1051

OTHER PUBLICATIONS

Reinhard, Frank et al: "Enabling Multi-Tenant Networks for the Automation Industry"; 2019 International Conference On Networked Systems (NETSYS), IEEE; Mar. 18, 2019 (Mar. 18, 2019), pp. 1-6.

"65C/xxx/CD-2-60802 IEC/IEEE:2020 (DI.2) Contents" IEEE Draft; 60802-Steindl-Clause4-0121-V17-Clean, IEEE-SA, Piscataway, NJ USA; vol. 802.1 60802 drafts, Feb. 8, 2021, pp. 2-7, URL:http://www.ieee802.org/1/files/private/60802-drafts/dl/60802-Steindl-Clause4-0121-v17-clean.pdf.

Unknown; "Management"; 60802 EC/IEEE:2020 (D1 .2); pp. 2-7; (downloaded Mar. 12, 2021).

Günter Steindl; "End station model Requirements and assigned features"; IEC/IEEE 60802; Version V05—Feb. 2021; XP68180609, pp. 1-30.

* cited by examiner

METHOD AND APPARATUS FOR CONFIGURING AN APPLICATION

The present patent document is a § 371 nationalization of PCT Application Serial No. PCT/EP2022/055722, filed Mar. 7, 2022, designating the United States, and this patent document also claims the benefit of European Patent Application No. 21164533.8, filed Mar. 24, 2021, which are incorporated by reference in their entireties.

TECHNICAL FIELD

The disclosure relates to methods and apparatuses for configuring applications.

BACKGROUND

The optimum utilization of data is becoming more and more important for industry. Many companies have already recognized that and analyze data from machines and installations on industrial PCs with the aid of dedicated software. That gains valuable insights but is complex and requires frequent manual interventions in order that the software, operating system, and data security are always up-to-date.

Time-Sensitive Networking (TSN) denotes a series of standards being developed by the Time-Sensitive Networking Task Group (IEEE 802.1). The standards that have been standardized define mechanisms for transmitting data via Ethernet networks. For the most part, the projects define extensions of the Bridging standard IEEE 802.1Q. These extensions primarily address transmission with very low transmission latency and high availability. One important area of application is real-time control streams used for control purposes, e.g., in automobiles, modern aircraft, or industrial installations.

With the use of Industrial Edge, the optimum data utilization in the field, (e.g., for the industrial installation), functions more simply, more flexibly, and more securely. Data is acquired and processed directly and in a safeguarded manner at the machine; a central system is available for management, provision of software, and updates thereof. An Industrial Edge management system is the central infrastructure that manages all connected edge devices of any type. Instead of having to install updates and security patches individually on each device, everything is controlled centrally from one system, which may be installed as required on site or in the cloud.

On the edge devices, the known open source software "Docker" may be used (but not exclusively) for generating and managing the containers, this software, courtesy of container visualization, having numerous advantages such as low resource requirements, rapid provision, and simple handling. New applications may be developed in any desired high-level languages (e.g., C/C++, Java, Python, Node.js), may be virtualized as a docker image, and may be executed in a scalable manner on all edge devices.

This requires an appropriate runtime environment that defines the available and stipulated prerequisites of the runtime system with respect to the runtime of the computer programs. The system is defined by the elementary constituents of the programming language such as the behavior of speech constructs and further functions such as type testing, debugging, code generation, and code optimization. The runtime environment furthermore includes runtime library, standard libraries, programming interfaces, runtime variables, and also hardware and software components regarding operating system functions.

Industrial Edge is positioned directly in automation installations and in the future this will also make it an attractive platform for TSN-enabled Industrial Edge applications in order, for example, to obtain control and machine data via a communication network (for example, OPC UA PubSub TSN) with a guaranteed transmission quality ("Quality of Service", QoS) and to process these data further.

No other technology has shaped IT in recent years as much as container technology. In this case, a so-called container functions as a vessel for applications, including required components such as frameworks or libraries. In a manner similar to that for the known virtualization of different operating systems on a server, containers virtualize applications that are each unaware of one another. All virtualized applications run under the same host operating system, which saves data overhead compared with the traditional virtualization of entire operating systems.

The provision of applications is simplified by the use of container technology because containers that contain all necessary information may easily be transported and installed as files. Containers provide the separation and management of the resources utilized on a computer. A container engine is a piece of software that accepts user queries, including command line options, retrieves images, and executes the container from the point of view of the end user.

It has been assumed hitherto that a TSN application is packaged in containers in the same way as in virtual machines (VMs). In this case, however, each individual TSN application container needs to bring along a complete TSN terminal stack. Moreover, in the case of Industrial Edge, the container host needs to be equipped with the incomparably more complex TSN stack for switching centers (switches) instead of with a TSN stack for terminals. The container host also needs to be managed as a network infrastructure device.

If a developer of Industrial Edge applications builds TSN-enabled container applications in the same way in which previous automation devices and their firmware or virtual machines (VMs) were developed, the optimization potential of container technology vis-à-vis VM technology will be squandered. Not only is it necessary for each TSN application container to be equipped with a complete TSN device stack and for this to be continuously maintained and configured to innovations, but the host (such as an Industrial Edge) that hosts these containers, although actually a terminal, then additionally also requires a TSN switch software stack. A (virtual) TSN switch stack is required in this case in order to connect the containers within an Industrial Edge to the TSN interface to the automation network. The software stacks required for TSN switches are significantly more complex than terminal stacks. Moreover, the resource requirements for actually redundant software stacks may become hugely inflated with the use of a plurality of TSN applications.

Application developers want to have to incorporate and maintain only the absolutely essential TSN software in their container applications, but not complete TSN device stacks. At the same time, their TSN application containers are able to request TSN streams from the network dynamically at any time (ad hoc). For this, they require topology information from the edge device (like the device access point(s) for TSN network(s)) in the simplest manner possible.

Developers and architects of the edge runtime platform ("edge OS") want to or must, for economic reasons, minimize the software complexity of the edge runtime software (e.g., of a container host). The use of a TSN switch software stack is at odds with this goal and additionally leads to operational complications for the customer because a device that is actually in use as a terminal would at the same time belong to the network infrastructure device (e.g., switching device, switch, bridge, . . . ) owing to the container technology.

It is an inherent characteristic of the TSN architecture that the TSN applications in terminals have to uniquely identify and signal to the TSN network, and in particular to a TSN network controller associated therewith, their transfer point between application and network. However, by virtue of the decoupling of the TSN endpoints in containers from the actual network access point ("physical network interface") of an edge terminal, in principle it is not actually possible in the first place for the TSN applications to be able to signal correct transfer points to the TSN network controllers. A normal TSN terminal stack in a container would signal the internal container network access, but that is not known to the network controller, because otherwise both a complex TSN terminal stack (e.g., a dedicated stack for each container) and in addition exactly one TSN switch stack are required.

In the TSN environment it has been assumed hitherto that containers may be considered analogously to virtual machines (VMs). Both containers and VMs thus correspond to full TSN terminals ("TSN end stations" in accordance with IEEE 802.1), which requires a corresponding software stack for terminals in each individual container, as already described above. Furthermore, in a manner similar to that for virtual machines, a virtual TSN switch including the requisite TSN switch software stack is required, except this time in the container host instead of in the hypervisor (also called virtual machine monitor, VMM). That is a class of systems that serves as an abstracting layer between actually available hardware (and, if appropriate, operating system already installed on the system) and further operating systems to be installed. These systems allow a virtual environment (hardware resources, in particular CPU, memory, hard disk space, available peripherals) to be defined which serves as a basis for the installation of (guest) operating systems independently of the hardware actually available.

If the container host is not executed directly on the real hardware but is instead located in a virtual machine (such as in a hardware PLC/programmable logic controller in the case of Industrial Edge, for example), then the consumption of resources increases further because both hypervisor and container host each require a complete TSN switch software stack.

SUMMARY AND DESCRIPTION

It is therefore an object of the disclosure to specify a technical solution for containerized TSN applications in which the application manages without a complex TSN stack and the respective container host (e.g., Industrial Edge, cloud cluster node, etc.) acts only as a terminal and not as a network infrastructure component.

It is additionally an object of the disclosure to support the network separation of automation technology, and thus more than one TSN network access, and to protect application developers from the resultant complications.

The object is achieved by a method, a computer program product configured to carry out the acts of the method, or an apparatus as described herein. The scope of the present disclosure is defined solely by the appended claims and is not affected to any degree by the statements within this summary. The present embodiments may obviate one or more of the drawbacks or limitations in the related art.

The method makes possible the configuration of an application that is introduced in a device for later execution by a container, wherein the device has an access point linking it to a communication network, and the container has a container access point with a first address.

With respect to the container access point, an associated device access point is determined with a second address ("ens33"), and with respect to the first address of the container access point and the second address of the associated device access point, a third address is determined, from an industrial automation management entity connected to the access point of the device via the communication network, and this is communicated to the application and configured by the thus obtained address information for the access points so that it is made possible for the access to the communication network via the access point of the device.

The apparatus TTIP supports the configuration of an application in a device having an access point, via which the device is linked to a communication network, with a first address ("ens33"), wherein the application is introduced in the device by a container, and the device is intended and suitable for executing the application as an edge device, and the container has a container access point with a second address ("eth0", NAP-ID).

In this case, with respect to the container access point, the apparatus (TTIP) determines an associated device access point with the first address and stores the device access point. With respect to the second address of the container access point and the first address of the associated device access point, the apparatus (TTIP) determines a third address (IP address), with respect to a TSN domain management entity (TDME, formerly industrial automation management entity IAME) connectable to the access point (NAP) of the device (DEV) via the communication network (T-NET). The apparatus (TTIP) communicates this obtained address information to the application for the purpose of configuration and in order to upgrade it for the access to the communication network via the access point of the device.

The container is connected via its container access point firstly via a virtual switching network to a virtual switching node within the device in order thus to obtain the required configuration data communicated to it.

In a further embodiment, managed object information associated with the device access point is determined on the basis of already available topology information about the communication network. This is advantageous because this information may be available, and therefore need not be provided in addition for the configuration.

In accordance with one advantageous embodiment, the device contains a container engine that provides information about the device-internal path from the network access point to the container with the application. This is particularly advantageous if the method is applied with already known realizations of container technology, such as Docker, which is known to a person skilled in the art. A container engine is already provided here and then needs only to be upgraded to provide the desired information for the method.

The method may take place via the communication network (T-NET) by Time-Sensitive Networking in accordance with the IEEE 802.1 standard. Advantageous effects are described further below.

The configuration information to the application may be transferred for example by (one or more) environment variables or else by a configuration file. This procedure proves to be advantageous because it is possible to have recourse to already known mechanisms and the underlying technology therefore does not need to be altered and adapted to the method more than is necessary.

BRIEF DESCRIPTION OF THE FIGURES

The disclosure is explained in greater detail below by reference to the figures, in which.

DETAILED DESCRIPTION

Figure 1:
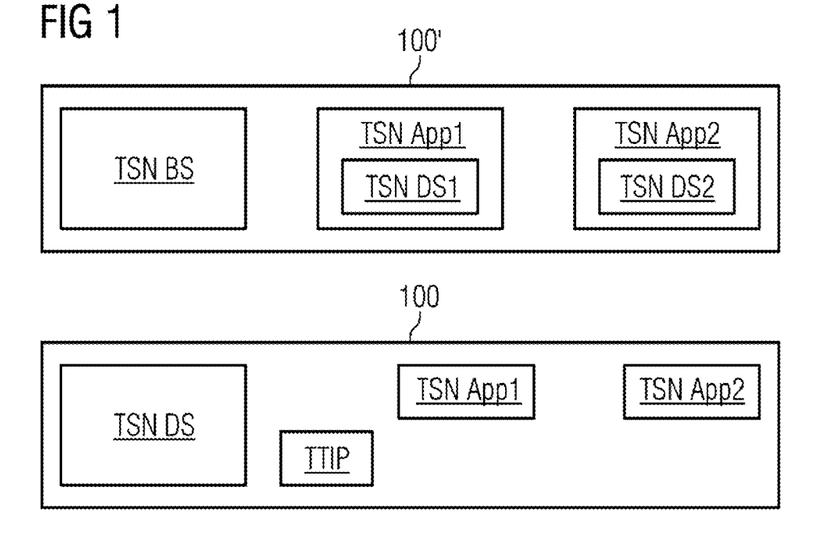
FIG. 1 depicts an example of a schematic comparison of containerized applications according to the prior art and according to the disclosure.

FIG. 1 elucidates the advantageous difference (as already described above) between the known prior art and the solution according to the disclosure. The upper box 101' illustrates an arrangement, according to the prior art, of a system with two exemplary TSN applications TSN App1, TSN App2, which, as described above, is delivered in such containers. The number of applications presented here is not intended to be restricted to two. Any desired number of containers is conceivable. At present, each container additionally contains a TSN device stack TSN DS1, TSN DS2 as that software that is responsible for the terminal control plane of TSN. Moreover, the system contains a TSN bridge stack, TSN BS, for carrying out the required switching tasks, (e.g., that software that is responsible for the control plane of the TSN bridges).

A disadvantage of the software kept redundant heretofore is obvious to a person skilled in the art. The code used is unnecessarily expanded, the installation and maintenance outlay is high, and errors may also creep in as a result, (for example, owing to obsolete or different versions used in the individual applications). The applications have not been installed on the system either by the same provider or at the same time.

The lower box 100 then shows by comparison the situation when the procedure according to the disclosure is adopted. No stack is required in the containers of the two TSN applications TSN App1, TSN App2. That is, these containers may stay lean, and it suffices to "package" the actual application. It is sufficient for one instance of the communication stack TSN DS to exist in the system.

Figure 2:
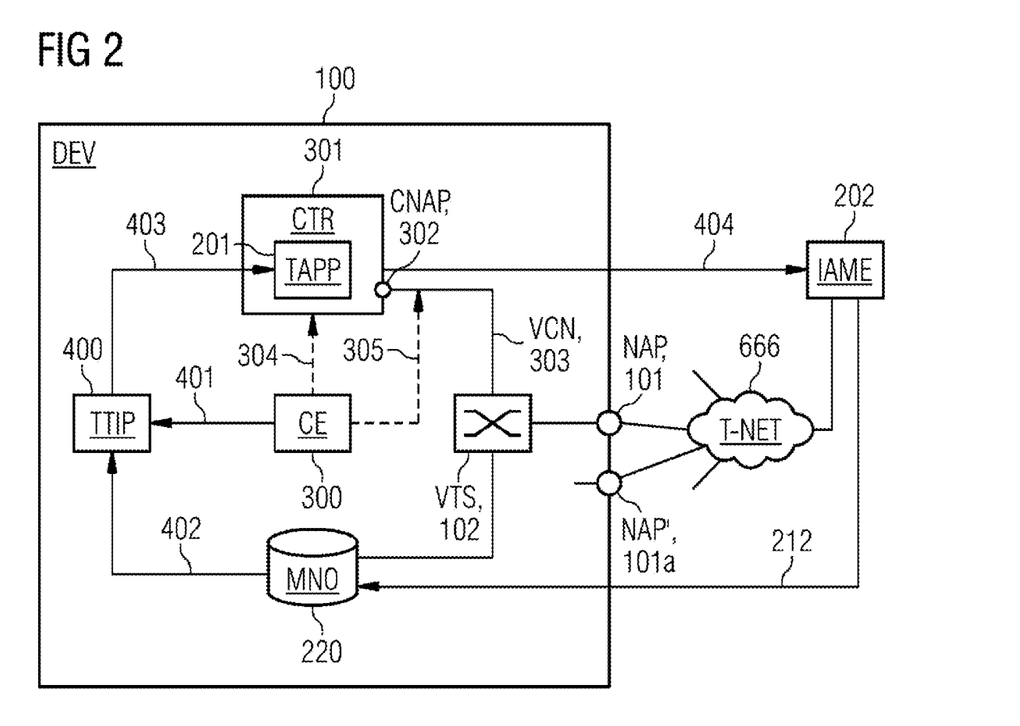
FIG. 2 depicts an overview of an example of a set-up of the network elements.

The disclosure with its affected components and the exchanged information is explained in greater detail in FIG. 2.

The object is achieved by a novel component in the network, hereinafter also called "TSN topology information provider module," TTIP, 400.

For each container CTR, 301 with TSN application TAPP, when it is set up by the container runtime system, the novel component, "TSN topology information provider" module TTIP, determines the ISO/OSI layer 2 network interconnection, determines therefrom the topological information of the associated external network access point NAP, 101, 101a of the container host and the responsible industrial automation management entity IAME, 202, and provides this information to the respective container CTR, 301 in a form so that the TSN application located therein may in turn then successfully reserve (establish) TSN streams in the TSN network.

As soon as a container CTR, 301 with a TSN application TAPP is intended to be newly set up and networked, the new component TTIP, 400 is incorporated into the procedure. The component TTIP then requires (directly or indirectly) from the container engine CE, 300 information 304, 305 about the TSN interface or interfaces NAP, NAP' of the device DEV, 100 with which the container with the TSN application CTR, 301 is intended to be connected on the data link layer (layer 2). In this case, the device DEV, 100 may also have more than one NAP, NAP' 101, depending on the automation network.

In the case of Industrial Edge, the assignment of the container CTR (with application TAPP contained therein) to the interface NAP, NAP' cannot be stipulated beforehand by the application developer and stored in the latter's application TAPP because the developer cannot know either the concrete target hardware and thus its concrete designators of the interfaces (for example, "ens33" or "enp0s3"; in this respect, see the explanations further below) or the assignment to one or more automation networks that is desired by the user.

The "first" or "second" interface is potentially known (e.g., "ens33" or "ens34"), but the question is whether the user has chosen "ens34" or actually "ens33" for this application.

Therefore, it may only be when a container CTR, 301 is actually started that the container is connected by its own container-local access point CNAP, 302 ("eth0" or "tsn0" in the example) to a virtual TSN switch VTS, 102 via a virtual container network VCN, 303. In this case, the information necessary for the later connection of the container CTR, 301 to a concrete network comes from the configuration of the device DEV and in particular the Industrial Edge runtime environment. The virtual TSN switch VTS, 102 is in turn device-internally connected to the network access point NAP, 101 or NAP', 101a, which forms the respective TSN access to the external communication network, TSN network T-NET, 666, for the device DEV, 100. It is unimportant here whether the virtual TSN switch VTS, 102 is an autonomous virtual (software) component, or else forms part of the hardware and firmware of the network access point NAP.

The use of the new component "TSN topology information provider" module TTIP, 400 is particularly advantageous for the network separations that may be used in automation technology and in which an individual automation device (e.g., an Industrial Edge device) is connected to more than one network at the same time.

In the case of Industrial Edge as already described, by the appropriate runtime environment ("Industrial Edge runtime" software) as an application orchestrator in a device DEV, 100, when an application is started, the final container and network (VCN) configuration is generated and transferred to the container engine CE, 300.

Orchestration is understood to mean flexibly combining a number of services to form a composition.

This information, in addition to the network assignment, is thus also available to the novel component, "TSN topology information provider" module TTIP, 400, and so the concrete system-specific name of the network access point NAP, 101 (for example in the form of the name or index of the relevant interface/network interfaces) is known ("ens34").

Furthermore, the "TSN topology information provider" module TTIP, 400 determines the "industrial automation management entity", IAME, 202 responsible for the network access point NAP, 101 and the downstream communication network T-NET, 666. For this purpose, if appropriate, the "TSN topology information provider" module TTIP accesses the topology information about the device-internal virtual networks that is provided by the operating system, if specific implementations of a container engine CE, 300 do not, for their part, have the complete information concerning the virtual networks.

The respectively responsible industrial automation management entity IAME, 202 has announced itself to the terminals found as part of its network discovery by using mechanisms defined in TSN specifications (DISCovery & IFC Interface Configuration, 212) to set inter alia a so-called managed network object MNO, 220, with its IP address, for example by way of the "netconf" protocol (in accordance with RFC 6241).

In this case, on the basis of the previously determined information 401, the "TSN topology information provider" module TTIP decides which managed network object MNO, with an IAME address, the module specifically needs to read out, 402: the selection criterion here is the network access point NAP identification (name, index, . . . ). With this IP address, later a TSN application TAPP, 201 may reserve or request from the industrial automation management entity IAME one or more TSN streams by way of the "add stream" service AS, 211.

Afterward, the "TSN topology information provider" module TTIP makes available the information concerning the network access point NAP and the industrial automation management entity IAME as a data set (403) to the TSN application (201) in the TSN container (301). This data set may appear as follows, by way of example:

tsn
nap: "ens34"
iame: "192.168.6.66"

The provision may take place in various ways, for example, by so-called "environment variables" for the processes started in the container or by way of a configuration file introduced ("mounted") into the container ad hoc with the data set, 403.

This second form of provision may also react to changes in the TSN network, for example, if the relevant managed network object MNO, 220 at the runtime of an application subsequently needs to be changed and a restart of the TSN container is undesirable.

For this purpose, the TSN application TAPP, 201 may monitor the data set (403) by conventional OS methods for notification in the event of changes to files. In addition, the TSN topology information provider module TTIP in turn monitors the relevant managed network objects MNOs, 220 for changes, 212, by way of an industrial automation management entity IAME, 202.

A TSN application TAPP, 201, for its part, requires the data set 403 in order to be able to establish a communication connection 404 to the TSN stream service API of the industrial automation management entity IAME, 202 and then to be able to set up or reserve TSN streams. The IP address of the industrial automation management entity, IAME is used for establishing the connection. The network access point NAP identification is then transmitted as a parameter of a TSN stream reservation AS, 211 in order that the industrial automation management entity IAME may configure the stream through the communication network T-NET, 666 up to the correct network access point NAP, 101. The container engine CE, 300 has already provided, 401 the basic internal path from the network access point NAP to the container CTR in the TSN application TAPP. An automatic stream configuration of the internal virtual TSN switch VTS, 102 may be provided in this case.

Figure 3:
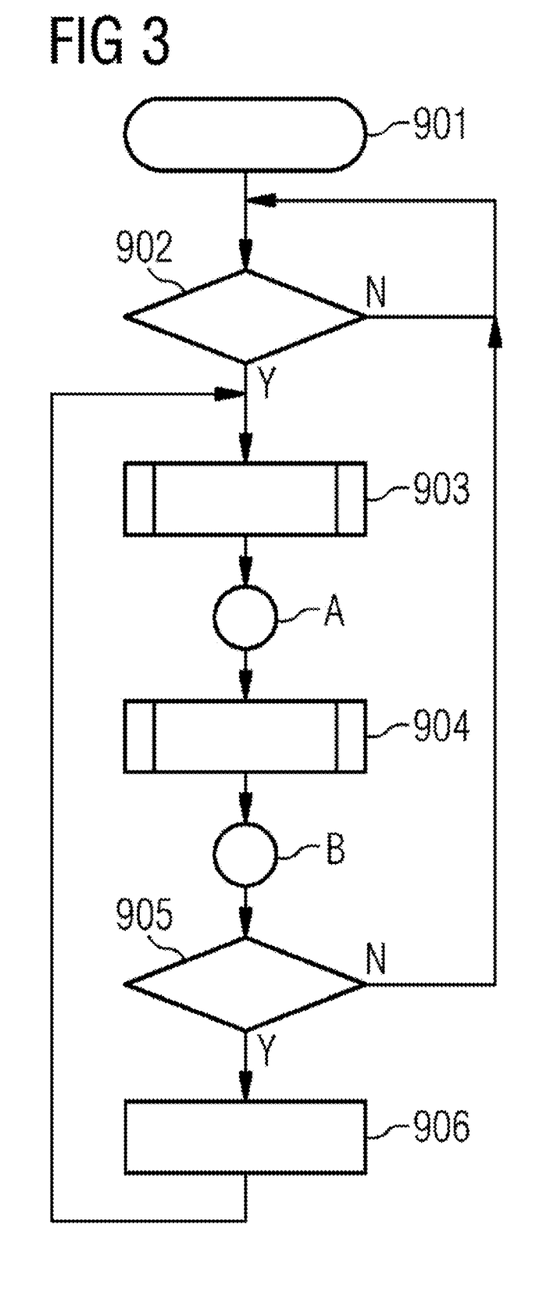
FIGS. 3 to 6 depict examples of the information flow in the network element.

FIG. 3 shows a method which proceeds in the novel module TTIP. Proceeding from a start state 901, act 902 involves checking whether an MNO with IAME network address has been set or changed. If this is the case, Y, act 903 involves determining a TSN application container (not yet acquired).

In act 903, the address information required for the start of the TSN application container is then determined. The method act carried out here are elucidated in specific detail in FIG. 5. Execution of these acts is followed by return to exit point A.

The result after execution of this subroutine A is a list of tuples containing information concerning the container access point CNAP, the responsible network access point NAP and the IAME address, act 904. In this case, a container may also have more than one access point CNAP, for example, if connected machines are intended to be addressed from completely separate TSN networks; however, this is not illustrated in the Figure.

In a next act, the (first) new or changed TSN application container thus determined is newly started or configured, B. The requisite acts are illustrated once again in greater detail in FIG. 6.

At the end, a check is made to ascertain whether there are still further TSN application containers, in act 905. If this is not the case, N, then there is a return to the beginning of the routine and the method begins again from the outset with act 902. Otherwise, if there are still further containers, then the query 901 is skipped and the method continues directly with the first subroutine 903.

Figure 4:
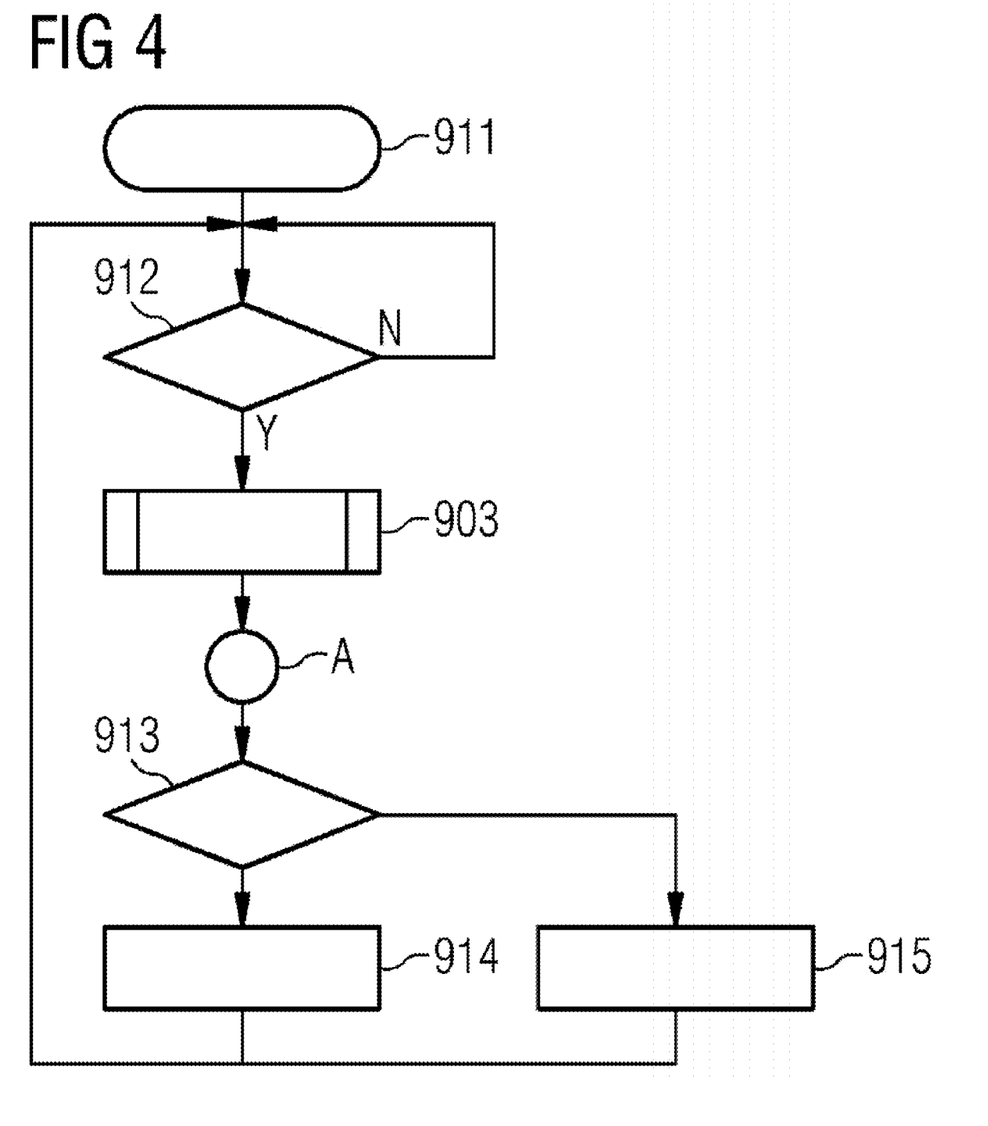

FIG. 4 shows a further method sequence in the novel module TTIP. The starting point for this method sequence in act 912 is that a new TSN application container was started or an (old) container was restarted. If this was the case, Y, then once again a further act 903 involves determining the TSN application container.

In act 903, the address information required for the start of the TSN application container is then determined. The method acts carried out here are elucidated in specific detail in FIG. 5, as mentioned above. Execution of these acts is followed by return to exit point A.

In act 913, the information thus determined (TSN application container—IAME tuples) is published, e.g., either as a "configuration file" with the determined tuples (container access point CNAP, network access point NAP, IAME address), which is written in act 914. Alternative solutions are conceivable, e.g., act 915 involves the forwarding of an environment variable to the environment of the (new) container with the TSN application.

Figure 5:
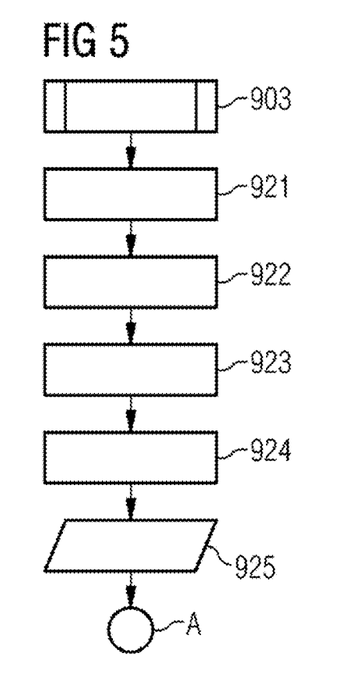

The sequence of the first subroutine 903 from FIGS. 3 and 4 is set out in FIG. 5.

A first act 921 involves determining the container access point(s) CNAP for the TSN application-containing containers CTR, by the container engine CE being consulted.

In act 922, the (respective) path from the container access point to the connected network access point NAP is determined.

In act 923, at least one associated managed object MNO with respect to the network access point NAP is determined.

In act 924, on the basis of the managed object MNO, the associated IAME address may then be found.

The result is then the tuple (CNAP, NAP, IAME address), as already described above, in act 925, with which there may be a return again to the respective routines from FIG. 3 or 4.

Figure 6:
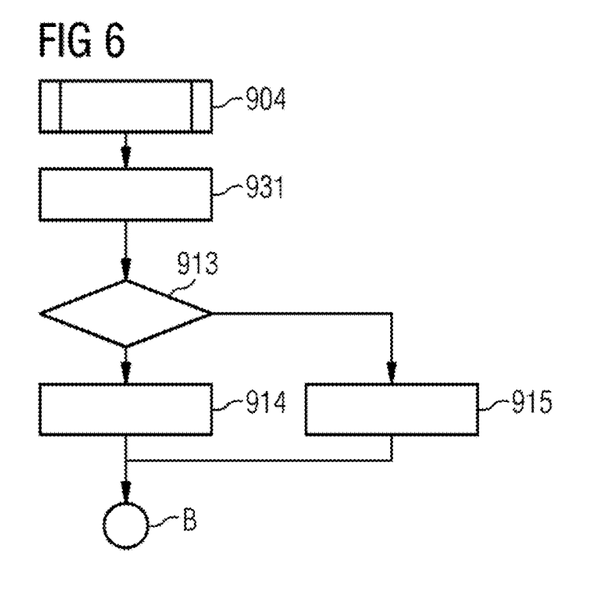

The sequence of the second subroutine 904 from FIGS. 3 and 4 is set out in FIG. 6.

In act 931, the information determined from the first subroutine is published, in act 913. In this case, in act 914, the configuration data are overwritten with the newly determined information (CNAP, NAP, IAME address). Alternatively, in act 915, the container CTR with the TSN application TAPP is restarted (see analogously to FIG. 4).

Figure 7:
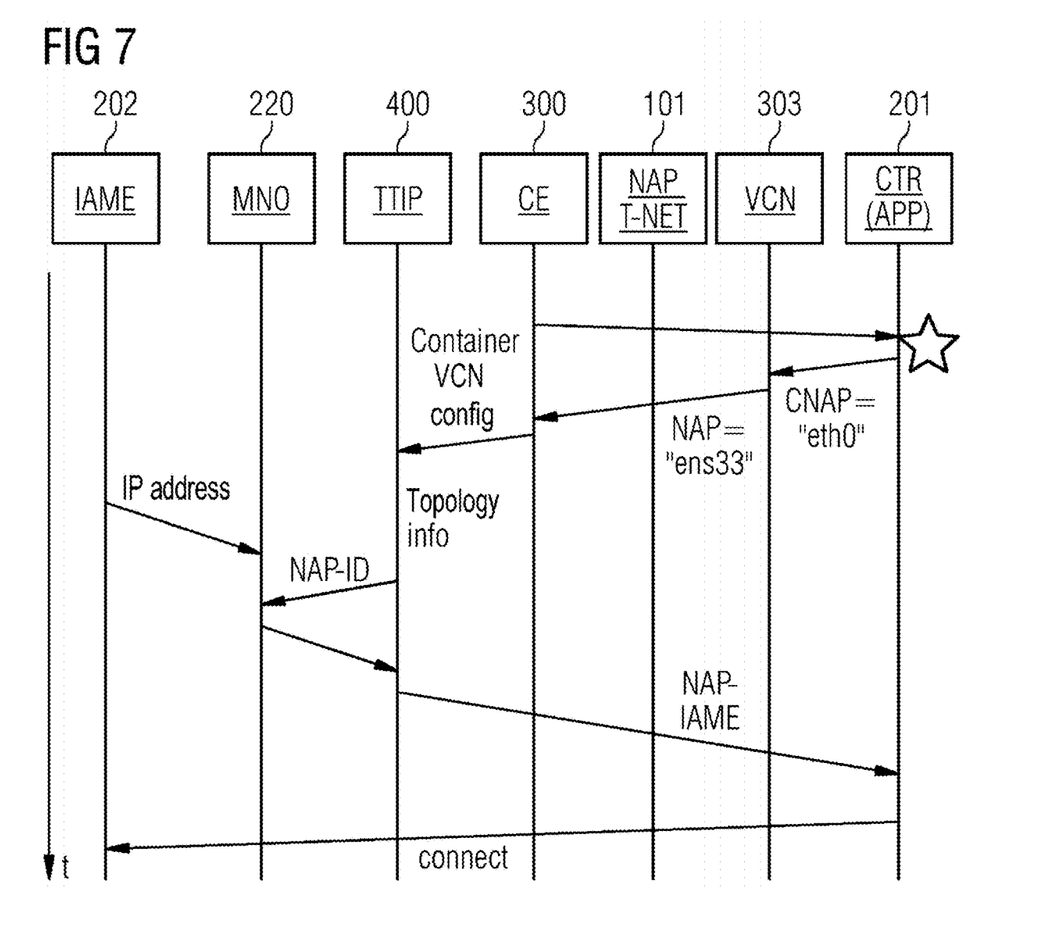
FIG. 7 depicts an example of the information flow over the course of time between individual network elements in accordance with FIG. 2.

FIG. 7 takes up the above-described procedure again from a different perspective and shows the information exchange between the individual components from FIG. 2 over the course of time t.

Firstly, by way of example, a new container CTR, 201 is introduced (symbolized by the star). The container access point CNAP (called "eth0" in the example, as already described above) is passed on to the virtual container network VCN, 303. The associated access point NAP, 101 of the device DEV to the communication network T-NET, 666 ("ens33" in the example) is passed on to the container engine CE, 300. This information is stored in the novel network element TTIP, 400.

In parallel therewith, the IAME, 202 has stored as managed object MNO the IP address at which it is reachable via the communication network T-Net (not illustrated in the flow diagram).

The novel network element then recognizes the associated tuples (CNAP, NAP, IAME address), as described above in FIGS. 3 to 6, and passes on this information to the container CTR, 201 with the TSN application TAPP.

In the next act, the application with this information may then connect to the industrial automation management entity IAME.

The described method and the apparatus enable a simplified TSN application development with as minimal software complexity as possible; the Industrial Edge ecosystem and here in particular the runtime platform is thus enhanced. This is done in particular by developers of TSN applications (containers) being freed of the need to license, integrate and maintain complete TSN terminal stacks.

Operators and developers of edge terminals are freed of the need to equip these terminals additionally also as infrastructure devices in the form of TSN switches (software stack).

Operators of edge terminals may integrate them purely as terminals in their customer installations, instead of additionally as a network infrastructure component (TSN switch).

Advantageously, the internal virtual TSN communication structure remains hidden from the TSN installation network; for example, this prevents the starting and stopping of TSN application containers from resulting in unnecessary replanning passes of TSN network controllers or pairwise updating processes between individual TSN switches.

By virtue of a simplified development of TSN-enabled edge applications, these may be offered more cost-effectively, and the barrier to entry for the development of new TSN applications is thus reduced.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for configuring an application, the method comprising:
introducing the application in a device by a container, wherein the device is configured for executing the application as an edge device, wherein the device has a network access point with a first address, wherein the device is linked to a communication network via the network access point using a Time-Sensitive Networking standard in accordance with IEEE 802.1, wherein the container has a container access point with a second address and wherein the device has a container engine that provides information about a device-internal path from the network access point to the container;
determining, with respect to the container access point with the second address, the network access point with the first address;
determining at least one managed object information associated with the network access point based on topology information about the communication network;
determining, using the at least one managed object information, a third address of an industrial automation management entity connected to the network access point of the device via the communication network;
configuring the application by obtained address information for access points by assignment of the second address, wherein the obtained address information comprises the first address of the network access point of the device, the second address of the container access point, and the third address of the industrial automation management entity; and
upgrading the application for access to the communication network via the network access point of the device.

2. The method of claim 1, wherein the container is connected via the container access point via a virtual switching network to a virtual switching node within the device.

3. The method of claim 1, further comprising:
transferring the information to the application by an environment variable.

4. The method of claim 1, further comprising:
transferring the information to the application by a config file.

5. A non-transitory computer readable medium comprising a computer program product, wherein the computer program product, when executed, is configured to cause a device to:
introduce an application in the device by a container, wherein the device is configured for executing the application as an edge device, wherein the device has a network access point with a first address, wherein the device is linked to a communication network via the network access point using a Time-Sensitive Networking standard in accordance with IEEE 802.1, wherein the container has a container access point with a second address, and wherein the device has a container engine that provides information about a device-internal path from the network access point to the container;

determine, with respect to the container access point with the second address, the network access point with the first address;

determine at least one managed object information associated with the network access point based on topology information about the communication network;

determine, using the at least one managed object information, a third address of an industrial automation management entity connected to the network access point of the device via the communication network;

configure the application by obtained address information for access points by assignment of the second address, wherein the obtained address information comprises the first address of the network access point of the device, the second address of the container access point, and the third address of the industrial automation management entity; and upgrade the application for access to the communication network via the network access point of the device.

6. An device comprising:

a container;

a network access point configured to link the device to a communication network using a Time-Sensitive Networking standard in accordance with IEEE 802.1 with a first address;

an apparatus configured to support a configuration of an application in the device, wherein the application is configured to be introduced in the device by the container, wherein the device is configured to execute the application as an edge device, wherein the container has a container access point with a second address, and wherein the apparatus is configured to:

request access information about a device-internal path from the network access point to the container with the application from a container engine;

determine and store the network access point associated with the container access point with the first address;

determine at least one managed object information associated with the network access point based on topology information about the communication network:

determine, using the at least one managed object information, a third address of an industrial automation management entity connected to the network access point of the device via the communication network;

configure the application by obtained address information by assignment of the second address, wherein the obtained address information comprises the first address of the network access point of the device, the second address of the container access point, and the third address of the industrial automation management entity; and upgrade the application for access to the communication network via the network access point of the device.

7. The device of claim 6, wherein the apparatus is further configured to access the container via the container access point via a virtual switching network to a virtual switching node within the device.

8. The device of claim 6, wherein the apparatus is further configured to transfer configuration information to the application by an environment variable.

9. The device of claim 6, wherein the apparatus is further configured to transfer configuration information to the application by a config file.

10. The device of claim 6, wherein the apparatus is a Time-Sensitive Networking (TSN) topology information provider module.

* * * * *